Dec. 6, 1966  H. HABERMANN  3,290,527
COMMUTATOR, PARTICULARLY FOR ELECTRICAL MACHINES
Filed Oct. 14, 1964  2 Sheets-Sheet 2

United States Patent Office 3,290,527
Patented Dec. 6, 1966

3,290,527
COMMUTATOR, PARTICULARLY FOR ELECTRICAL MACHINES
Helmut Habermann, Nurnberg, Germany, assignor to Siemens-Schuckertwerke Aktiengesellschaft, Berlin-Siemensstadt, and Erlangen, Germany
Filed Oct. 14, 1964, Ser. No. 403,829
Claims priority, application Germany, Oct. 15, 1963, S 87,863
8 Claims. (Cl. 310—233)

My invention relates to commutators for rotary electrical machines such as motors and generators.

There are known commutators whose individual laminations have lateral recesses which conjointly form an annular groove in the assembled condition of the commutator. Insulated rings of metal or rings of hard paper composition are seated in the grooves and hold the laminations together. Such commutators, as a rule, have small dimensions and are suitable only for low peripheral speeds because the synthetic plastics which insulate the metal rings, or the rings of hard paper mass, cannot withstand high centrifugal forces. For that reason, the collector laminations have been placed in meshing engagement on the inward side with rings of insulating material, and further rings of tensionally strong synthetic thermoplastic material or insulated steel have been provided for receiving the centrifugal forces. The manufacture of such commutators is rather expensive. At high operating temperatures the rings of thermoplastic synthetics become deformed, or the rings of hardened paper mass tend to excessively shrink, thus causing operating trouble by distorting the commutator from its circular shape.

It is an object of my invention to provide commutators whose laminations are held together by the rings of insulating material pressed into lateral angular grooves of the lamination group, but which avoid the above-mentioned deficiencies.

According to the invention, the insulating tie rings consist of glass fiber strands which are wound to the ring shape and impregnated with resinous bonding material, such as casting resin, and hardened before being pressed into the annular groove formed by the laminations.

According to another feature of the invention, one of the holder rings of wound and resin-bonded glass fiber has a portion which protrudes out of the annular groove and is seated upon the hub member of the commutator, thus centering the group of laminations relative to the hub.

According to another feature of the invention, the second holder ring, also formed of wound and resin-bonded glass fiber, has a portion protruding out of the lamination and resting upon an abutment structure which is located on the opposite side of the commutator and upon which the latter protruding portion is coaxially seated in order to likewise center the lamination group relative to the hub. Preferably, the just-mentioned abutment structure consists of a ring coaxially fastened to the hub member by shrinking.

The above-mentioned and more specific features of the invention will be apparent from the embodiments of commutators according to the invention illustrated by way of example in the accompanying drawings, in which.

Figure 1:
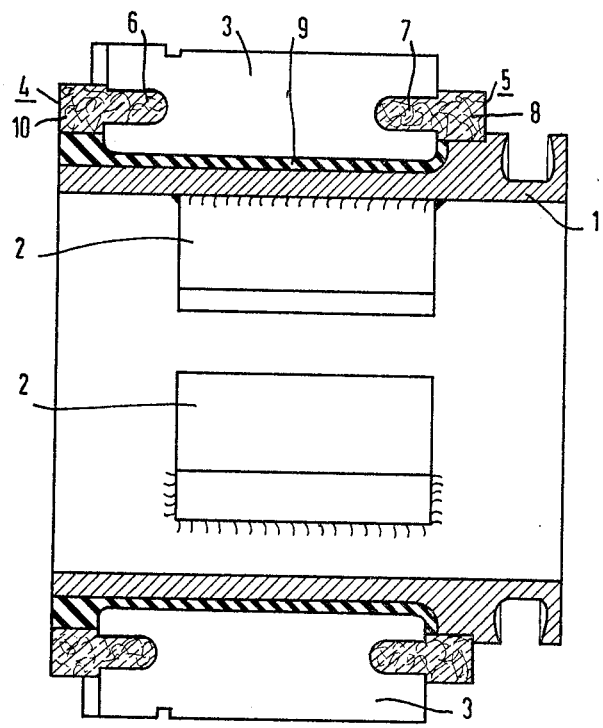
FIG. 1 is an axial section of a first embodiment of the commutator of the present invention.
Figure 2:
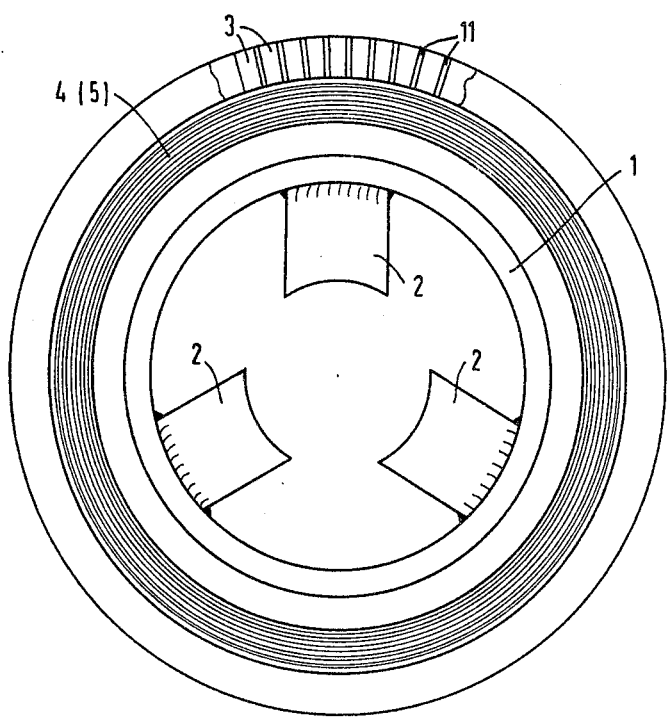
FIG. 2 is a cross section of the embodiment of the commutator of FIG. 1.

The commutator shown in FIGS. 1 and 2 comprises a hub member 1. Spacer legs 2 are welded to the hub member for coaxially seating it upon the shaft (not illustrated) of the machine. A circular group of laminations 3 is held together by two tie rings 4 and 5 whose inward portions 6 and 7 are tightly seated, coaxially about the hub member 1, in lateral grooves of the lamination group. The ring 5 has a portion 8 which protrudes out of the annular groove and rests upon a shoulder formed by the hub member 1, thus centering the lamination group relative to the hub member.

The rings 4 and 5 consist of wound strands of glass silk (glass fiber) and are resin-bonded, preferably by hardened casting resin. After the glass fiber rings are wound to the annular shape, impregnated and cured to assume the required strength and hardness, they need not be subsequently machined and exhibit a very high mechanical strength and thermal resistance. The annular space between the lamination group and the hub 1 of the commutator is filled by a layer 9 of insulating material, preferably consisting of synthetic plastic such as casting resin. The layer of plastic 9 is bordered on both axial ends by the holder-ring portions 8 and 10 protruding out of the respective annular grooves. The individual laminations of the group are insulated from each other by intermediate insulating inserts 11.

When assembling the commutator, a pressure clamp is used for producing the required arcuate pressure within the group of laminations. Then the separately completed holder rings 4 and 5 are pressed into the annular grooves of the lamination group. The ring 5 then centers the lamination group relative to the hub 1. The space between the lamination group and rings on the one hand, and the commutator hub on the other hand, can be filled with casting resin in which an ample quantity of quartz metal is admixed, no casting mold being required for this purpose. After curing and hardening of the resin in the interspace, the pressure clamp is loosened and removed. The mechanically strong rings 4 and 5 then receive the tensions resulting from the pressure of the lamination group.

By virtue of the invention, commutators as exemplified by the above-described embodiment can be produced in a particularly simple manner for use at the highest speeds of rotation occurring in practice, and also for the high operating temperatures of dynamoelectric machines. This also applies to the embodiment shown in FIGS. 3 and 4 and described presently.

Figure 3:
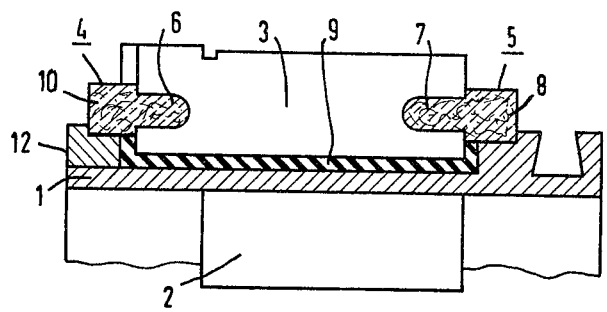
FIG. 3 is part of a longitudinal section of a second embodiment of the commutator of the present invention.
Figure 4:
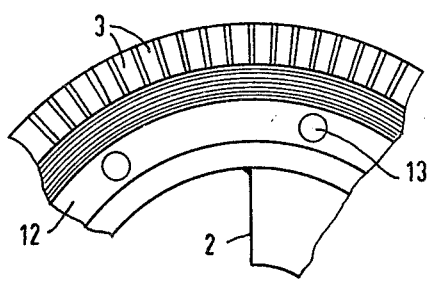
FIG. 4 is part of a side elevation of the embodiment of the commutator of FIG. 3.

The commutator of FIGS. 3 and 4 is mostly similar to the one of FIGS. 1 and 2, corresponding components being denoted by the same reference numerals. In distinction from the preceding embodiment, a steel ring 12 is shrunk upon the hub 1 of the commutator and thus rigidly and immovably fastened thereto. The steel ring 8 serves as a centering member for the protruding portion 10 of the resin-bonded glass fiber ring 6 which peripherally engages a shoulder of the steel ring 12. The holder rings 4 and 5 and the steel ring are so arranged that they fully enclose the interspace in which the intermediate insulation 9 is located, with the only exception that the steel ring 12 is provided with several bores 13 for pouring the synthetic resin into the interspace and then permitting the air to escape.

Due to the bilateral centering, the lamination group is reliably prevented from axial displacements. The intermediate layer 9 of casting resin is fully sealed from the environment by the holder rings and by the structure 12 rigidly joined with the commutator, so that, during subsequent immersion soldering, hard soldering or brazing, no solder material can come into contact with the layer of resin. Furthermore, since the molding space for the intermediate insulation is formed exclusively by components of the commutator itself, a separate mold for the casting operation is not required.

The above-mentioned casting resin of layer 9 preferably consists of epoxy resin on a glycerin base. Such resins are commercially available under the trade name Epoxyn (from Badische Anilin & Sodafbrik, Germany) or Resin–R–108 (from General Electric Co., USA). The resin is mixed with appreciable amounts of quartz metal. The rings 4 and 5 are produced preferably by pulling glass fiber strands through an unsaturated polyester resin so that each individual fiber is wetted by the resin. Suitable polyester resins are available under the trade name Leguval (from Bayer, Germany) or AR–Resin (from General Electric Co., USA). The wetted fibers are wound upon a mold and cured. The ratio of glass fiber to resin in the finished rings is about 80:20, for example.

I claim:

1. A commutator comprising a hub member, a circular group of commutator laminations surrounding said hub member and having peripherally sequential laminations extending substantially in respective radial planes, said group of laminations having two coaxial annular recesses in axially opposite sides respectively, an intermediate insulation of casting resin between said group of laminations and said hub member, and two tie rings formed of wound glass fiber strands and impregnated with hardened casting resin, said hardened rings being seated in said respective recesses and securing said laminations together.

2. A commutator comprising a hub member, a circular group of commutator laminations surrounding said hub member and having peripherally sequential laminations extending substantially in respective radial planes, said group of laminations having two coaxial annular recesses in axially opposite sides respectively, an intermediate insulation of casting resin between said group of laminations and said hub member, and two wound glass fiber rings internally bonded by hardened synthetic plastic, said two rings being seated in said respective recesses and having respective portions protruding axially beyond the axially opposite sides respectively of said group of laminations.

3. In a commutator according to claim 2, one of said protruding ring portions having its inner periphery coaxially seated on said hub member for centering said group of laminations.

4. In a commutator according to claim 3, said two protruding ring portions being directly adjacent to said intermediate insulation and sealing said insulation relative to the outside.

5. A commutator according to claim 3, comprising a centering abutment structure fixedly secured to said hub member at the side of said other protruding ring portion, and said latter ring portion being seated upon said structure.

6. A commutator according to claim 3, comprising a steel ring coaxially shrunk upon said hub member at the side of said other protruding ring portion, and said latter ring portion being seated upon said steel ring for centering said group of laminations.

7. In a commutator according to claim 6, said steel ring having bores to permit pouring said casting resin into the space between said group of laminations and said hub member.

8. In a commutator according to claim 6, said two protruding ring portions covering the interspace between said hub member and said group of laminations for confining said casting resin in said interspace.

References Cited by the Examiner

UNITED STATES PATENTS

| | | | |
|---|---|---|---|
| 1,284,524 | 11/1918 | Wilson et al. | 29—155.54 |
| 1,506,756 | 9/1924 | Kempton | 310—235 |
| 2,133,183 | 10/1938 | Baird et al. | 310—236 X |
| 2,501,502 | 3/1950 | Fletcher | 310—236 |
| 2,528,235 | 10/1950 | Loritsch | 310—235 X |

MILTON O. HIRSHFIELD, *Primary Examiner.*

ORIS L. RADER, *Examiner.*

C. W. DAWSON, D. F. DUGGAN,
*Assistant Examiners.*